US008483616B1

(12) United States Patent
Hall

(10) Patent No.: US 8,483,616 B1
(45) Date of Patent: Jul. 9, 2013

(54) NON-INTERFERENCE TECHNIQUE FOR SPATIALLY AWARE MOBILE AD HOC NETWORKING

(75) Inventor: Robert Hall, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 625 days.

(21) Appl. No.: 11/264,834

(22) Filed: Nov. 1, 2005

(51) Int. Cl.
*H04B 15/00* (2006.01)

(52) U.S. Cl.
USPC ........ 455/63.1; 455/67.11; 370/445; 370/442

(58) Field of Classification Search
USPC ............... 455/63.1, 500, 501, 502, 67.1, 104, 455/114.3
See application file for complete search history.

(56) References Cited

U.S. PATENT DOCUMENTS

| 6,015,344 | A | 1/2000 | Kelly et al. | |
|---|---|---|---|---|
| 6,304,556 | B1 * | 10/2001 | Haas | 370/254 |
| 6,628,620 | B1 | 9/2003 | Cain | |
| 6,781,971 | B1 | 8/2004 | Davis et al. | |
| 6,807,165 | B2 * | 10/2004 | Belcea | 370/347 |
| 6,816,460 | B1 * | 11/2004 | Ahmed et al. | 370/238 |
| 6,870,846 | B2 | 3/2005 | Cain | |
| 6,879,574 | B2 | 4/2005 | Naghian et al. | |
| 6,909,706 | B2 | 6/2005 | Wilmer et al. | |
| 6,937,602 | B2 | 8/2005 | Whitehill et al. | |
| 6,940,832 | B2 | 9/2005 | Saadawi et al. | |
| 6,954,435 | B2 | 10/2005 | Billhartz et al. | |
| 6,958,986 | B2 * | 10/2005 | Cain | 370/337 |
| 7,027,822 | B1 * | 4/2006 | Hwang et al. | 455/456.1 |
| 7,152,110 | B2 | 12/2006 | Pierce | |
| 7,179,166 | B1 | 2/2007 | Abbott | |
| 7,197,326 | B2 | 3/2007 | Acampora | |
| 7,295,521 | B2 * | 11/2007 | Choi et al. | 370/238 |
| 7,307,978 | B2 * | 12/2007 | Carlson | 370/349 |
| 7,525,933 | B1 | 4/2009 | Hall | |
| 7,613,467 | B2 | 11/2009 | Fleischman | |
| 7,813,326 | B1 | 10/2010 | Kelm et al. | |
| 7,917,169 | B1 | 3/2011 | Hall | |
| 7,969,914 | B1 | 6/2011 | Gerber | |
| 7,970,749 | B2 | 6/2011 | Uhlir et al. | |
| 8,085,813 | B2 | 12/2011 | Melick et al. | |
| 8,248,367 | B1 | 8/2012 | Barney et al. | |
| 2002/0141454 | A1 | 10/2002 | Muniere | |
| 2002/0155846 | A1 * | 10/2002 | Shiraga | 455/456 |
| 2002/0167960 | A1 * | 11/2002 | Garcia-Luna-Aceves | 370/442 |

(Continued)

OTHER PUBLICATIONS

W.-H Liao et al., "GRID: A Fully Location-Aware Routing Protocol for Mobile Ad hoc Networks," Telecommunication Systems, Klumar Academic Publishers, vol. 18, pp. 1-26, 2001.*

(Continued)

*Primary Examiner* — Nay A Maung
*Assistant Examiner* — Erica Fleming-Hall
(74) *Attorney, Agent, or Firm* — Woodcock Washburn LLP

(57) ABSTRACT

A system and method for reducing interference between wireless terminals communicating in a mobile ad-hoc network (MANET). Interference is reduced by dividing the MANET into a number of geographical areas having a specific size and shape. Each geographical area is assigned a time slot during which wireless terminals located in the respective geographical area may transmit to other wireless terminals. The time slots are assigned such that geographical areas having the same time slot are far enough away from each other that wireless terminals located in such same time slot geographical areas are outside the interference range of each other.

38 Claims, 3 Drawing Sheets

U.S. PATENT DOCUMENTS

| | | |
|---|---|---|
| 2003/0074413 A1 | 4/2003 | Nielsen et al. |
| 2003/0193394 A1 | 10/2003 | Lamb |
| 2003/0235158 A1 | 12/2003 | Lee et al. |
| 2004/0213270 A1 | 10/2004 | Su et al. |
| 2005/0058151 A1 | 3/2005 | Yeh |
| 2005/0152318 A1 | 7/2005 | Elbatt et al. |
| 2005/0152378 A1 | 7/2005 | Bango et al. |
| 2005/0254453 A1 | 11/2005 | Barneah |
| 2005/0259597 A1 | 11/2005 | Benedetto |
| 2006/0013154 A1 | 1/2006 | Choi et al. |
| 2006/0023677 A1 | 2/2006 | Labrador |
| 2006/0084444 A1 | 4/2006 | Kossi et al. |
| 2006/0126535 A1 | 6/2006 | Sherman |
| 2006/0128349 A1 | 6/2006 | Yoon |
| 2006/0148516 A1 | 7/2006 | Reddy et al. |
| 2006/0153157 A1 | 7/2006 | Roh et al. |
| 2006/0227787 A1 | 10/2006 | Furlong et al. |
| 2007/0008925 A1 | 1/2007 | Dravida et al. |
| 2007/0019594 A1* | 1/2007 | Perumal et al. ............... 370/338 |
| 2007/0110092 A1 | 5/2007 | Kangude et al. |
| 2007/0180533 A1 | 8/2007 | Ramaiah et al. |
| 2007/0198731 A1 | 8/2007 | Li et al. |
| 2007/0217346 A1 | 9/2007 | Zheng |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0266396 A1 | 11/2007 | Estermann |
| 2007/0287437 A1 | 12/2007 | Cartmell |
| 2008/0080401 A1 | 4/2008 | Ribiere |
| 2008/0144493 A1 | 6/2008 | Yeh |
| 2008/0159236 A1 | 7/2008 | Ch'ng |
| 2008/0163355 A1 | 7/2008 | Chu |
| 2008/0192737 A1 | 8/2008 | Miyazaki |
| 2009/0041039 A1 | 2/2009 | Bear |
| 2009/0045977 A1 | 2/2009 | Bai et al. |
| 2009/0046628 A1 | 2/2009 | Hall |
| 2009/0138353 A1 | 5/2009 | Mendelson |
| 2009/0175223 A1 | 7/2009 | Hall |
| 2009/0201860 A1 | 8/2009 | Sherman et al. |
| 2009/0245518 A1 | 10/2009 | Bae et al. |
| 2009/0248420 A1 | 10/2009 | Basir et al. |
| 2010/0029245 A1 | 2/2010 | Wood et al. |
| 2010/0067451 A1 | 3/2010 | Hall |
| 2010/0082513 A1 | 4/2010 | Liu |
| 2010/0214987 A1 | 8/2010 | Mori |
| 2010/0248843 A1 | 9/2010 | Karsten |
| 2010/0279776 A1 | 11/2010 | Hall |
| 2010/0304759 A1 | 12/2010 | Leppanen et al. |
| 2010/0329463 A1 | 12/2010 | Ratliff et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2012/0058814 A1 | 3/2012 | Lutnick et al. |
| 2012/0079080 A1 | 3/2012 | Pishevar |
| 2012/0094770 A1 | 4/2012 | Hall |

OTHER PUBLICATIONS

Y. -C Tseng et al., "Fully Power-Aware and Location-Aware Protocols for Wireless Multi-hop Ad Hoc Networks", Proc. of IEEE ' Intl. Conference on Computer Communications and Networks (ICCCn), 6 pgs., 2002.*
M. Ilyas, Ad Hoc Wireless Networks, CRC Press, Chapter 1, 2003.*
K.-P Shih, "A Collision Avoidance Power Control MAC Protocol for Wireless Ad Hoc Networks", Communication Letter, vol. 9 (9), pp. 859-861, Sep. 2005.*
K.-H Shih, "A Distributed Slots Reservation Protocol for QoS Routing on TDMA-Based Mobile Ad Hoc Networks", Networks (ICON 2004) Proceedings 12th IEEE Intl Conference, vol. 2, p. 660-664, 2004.*
Derek J. Corbett and David Everitt, "A Partitioned Power and Location Aware MAC Protocol for Mobile Ad Hoc Networks," Technical Report No. 553 (University of Sydney, School of Information Technologies), Jul. 2004.*
M. Conti, "Body, Personal, and Local Ad Hoc Wireless Networks", in The Handbook of Ad Hoc Wireless Networks, M. Ilyas, Ed. Boca Raton: CRC Press, 2002, Chapter 1.*
Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.
U.S. Appl. No. 13/327,472, filed Dec. 15, 2011, Hall.
U.S. Appl. No. 13/333,084, filed Dec. 21, 2011, Hall.
U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 12/939,386, filed Dec. 15, 2010, Hall.
U.S. Appl. No. 13/169,892, filed Jun. 27, 2011, Hall.
U.S. Appl. No. 13/169,829, filed Jun. 27, 2001, Hall.
U.S. Appl. No. 13/277,895, filed Oct. 20, 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks and Applications, Dec. 2002, 7, 471-480.
Hall et al., "A Two-Level Quality of Service Scheme for Collision based on Mobile Ad Hoc Networks", IEEE, 1-4244-1513-06/07, 2007, 8 pages.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010, 82-89.
Hall, "An Improved Geocast for Mobile Ad Hoc Networking," IEEE Transactions on Mobile Computing, 2010, 1-14.
Panta, "GeoV2V: Vehicular Communications Using a Scalable Ad Hoc Geocast Protocol," AT&T Labs Research, 14 pages, Nov. 14, 2011.
Balasubramaniam, et al. "Interactive WiFi Connectivity for Moving Vehicles," Proceedings of SIGCOMM, Aug. 17-22, 2008, 12 pages.
Maihofer, "A Survey of Geocast Routing Protocols," IEEE Communications Surveys, Jun. 2004, 32-42.
Das, et al., "SPAWN: A Swarming Protocol for Vehicular Ad-Hoc Wireless Networks," Proceedings of $1^{st}$ ACM Vanet, Oct. 2004, 2 pages.
German Aerospace Center, Simulation of Urban Mobility, 2010, http://sumo.sourceforge.net., 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbüttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the $5^{th}$ Annual ACM/IEEE International Conference on Mobile Computing and Networking, ACM, 1999, 151-162.

Manvi, et al., "Performance Analysis of AODV, DSR, and Swarm Intelligence Routing Protocols in Vehicular Ad Hoc Network Environment," Proceedings of IEEE Future Computer and Communications, Apr. 21-25, 2009.

Niculescu, et al., "Trajectory Based Forwarding and Its Applications," Proc. Mobicom 2003, ACM, 2003, 13 pages.

Ns-2, "The Network Simulator," 2010, http://isi.edu/nsnam/ns, 2 pages.

Schwingenschlogl, "Geocast Enhancements of AODV for Vehicular Networks," ACM SIGMOBILE Mobile Computing and Communications Review, Jun. 2002, 18 pages.

Shevade, et al., "Enabling High-Bandwidth Vehicular Content Distribution," Proceedings of CoNEXT 2010, Nov. 30-Dec. 3, 2010, 12 pages.

Yassein, et al., "Performance Analysis of Adjusted Probabilistic Broadcasting in Mobile Ad Hoc Networks," Proc. $11^{th}$ Intl. Conf. on Parallel and Distributed Systems Workshops, 2005, 27 pages.

Zahn, et al., "Feasibility of Content Dissemination Between Devices in Moving Vehicles," Proceedings of CoNEXT 2009, Dec. 1-4, 2009, 11 pages.

Zorzi, et al., "Geographic Random Forwarding (GeRaF) for Ad Hoc and Sensor Networks: Multihop Peformance," IEEE Transactions on Mobile Computing, Dec. 2003, 11 pages.

Social + Gaming—SWiK: http://swik.net/social+ gaming, Jul. 12, 2010.

http://askville.amazon.com/Wii-games-play-Internet-Family/AnswerViewer.do?requestId=6796582(2007).

Schutzberg, "Phone-based GPS-based Games: Missing Pieces"; http://www.directionsmag.com/articlephp?article_id=939 (Aug. 17, 2005).

"Boost Mobile Introduces First Location-based, GPS games in US" http://www.physorg.com/news5824.html (Aug 16, 2005).

"Sony bigwig hints at GPS-enabled PSP games"; http:www.vespacious.com/sony-bigwig-hints-at-gps-enabled-psp-games.html (Dec. 22, 2008).

Steve:" GPS-enabled Cell Phone Games" http://www.strangenewproducts.com/2005/08/gps-enabled-cell-phone-games.html (Aug. 15, 2005).

Location-Enabled Mobile Gaming; http://www.nn4d.com/site/global/market/affiliate_sites/lbsglobe/lbsapplications/mobilegaming.jsp (2007).

* cited by examiner

NON-INTERFERENCE TECHNIQUE FOR SPATIALLY AWARE MOBILE AD HOC NETWORKING

BACKGROUND OF THE INVENTION

The present invention is directed to a mobile ad hoc network (MANET). More specifically, the present invention is directed to a method and system for limiting interference between mobile units communicating in a MANET.

A MANET is basically a network of mobile wireless terminals, such as wireless phones, that communicate with each other within a given region or area. Each wireless terminal is capable of receiving/transmitting data packets to/from other wireless terminals in the network. The wireless terminals have a detection range (i.e. the distance within which a wireless terminal can detect a transmission from another wireless terminal) and a link range (i.e. the maximum distance apart two wireless terminals may be and yet still send data successfully from one to the other in the absence of interference), and an interference range (i.e. the maximum distance apart two wireless terminals A and B may be such that there exists a point P that is within link range of A and yet a transmission from B would interfere with the transfer of data from A to a wireless terminal located at P). A wireless terminal B is said to interfere with a transmission from terminal A to wireless terminal C if, in the absence of terminal B, terminal C would successfully receive the transmission from terminal A, and if terminal B transmits during the transmission from terminal A to terminal C it results in an unsuccessful reception of the transmission at terminal C.

The wireless terminals basically collaborate to route packets amongst themselves according to link relationships. Current approaches to MANET use Carrier-Sense Multiple Access with Collision Avoidance (CSMA/CA) techniques to control the broadcasting of the wireless terminals. In CSMA/CA, a wireless terminal briefly listens for the "carrier" presence. If it is present, the wireless terminal waits to transmit/broadcast. If it is not present, the wireless terminal transmits/broadcasts immediately.

In a MANET environment, the difficulty with CSMA/CA is that communications between a sending wireless terminal and a receiving wireless terminal may be lost when the sending wireless terminal is outside the detection range of a distant wireless terminal, and the receiving wireless terminal is within the interference range of the distant wireless terminal. When this happens, the sending wireless terminal will not detect the carrier of the distant wireless terminal and, in accordance with CSMA/CA, will transmit to the receiving wireless terminal. The transmission, however, will not be received by the receiving wireless terminal because its reception will be interfered with by the distant wireless terminal. Thus, broadcasting within a MANET can be unreliable due to such collision/interference from distant wireless terminals.

BRIEF SUMMARY OF THE INVENTION

The present invention provides a system and method for reducing interference/collision between wireless terminals in a MANET. This is accomplished by dividing the MANET into discrete geographical areas, and assigning transmission time slots to the geographical areas such that wireless terminals in different geographical areas having the same time slot are incapable of interfering with each other.

In accordance with an embodiment of the invention, a MANET is divided into hexagonal-shaped geographical areas wherein each geographical area has a diameter D (i.e. the maximum distance there can be between any two points in the geographical area), equal to the detection range of the wireless terminals, and each geographical area is assigned one of seven different time slots such that any two areas having the same time slot are separated by at least the interference range of the wireless terminals. Such a configuration ensures that the wireless terminals in a given geographical area are all within the detection range of each other, and that geographical areas having the same time slot are far enough from each other that wireless terminals in such "same time slot areas" can not interfere with each other.

Time may be partitioned into a set P of non-overlapping intervals, each of which is a contiguous interval of time. A time slot scheme for P is an association of each interval within P to one of a finite set of slots. For example, P could consist of 10 millisecond long intervals, each starting at an even multiple of 10 milliseconds since a reference origin time. A time slot scheme having seven slots numbered 0 through 6 would assign slot 0 to all intervals beginning at times 7k+0, slot 1 to all intervals beginning at times 7k+10, slot 2 to all intervals beginning at times 7k+20, etc., where k is any member of the set {0msec, 70 msec, 140 msec, 210 msec, . . . }. (Again, these times are measured from some predetermined time origin or synchronization point.) An alternative embodiment may choose a non-covering set of intervals, so that there could be 'gaps' not belonging to any assigned time slot.

In accordance with another embodiment of the invention, a wireless terminal communicating in a MANET is operable to determine its location using, for example, the global positioning system. The wireless terminal stores mapping information defining the MANET as being divided into a plurality of geographical areas and being assigned one of a set of time slots T. The wireless terminal determines which geographical area it is located in, based on its geographic location, and determines which time slot is assigned to the geographical area. The wireless terminal transmits only during the assigned time slot T.

The wireless terminal stores mapping information defining the MANET as being divided into a plurality of geographical areas. By way of non-limiting example, each geographical area could be a regular hexagon and have diameter D, wherein each of said areas is assigned a time slot T selected from a set of time slots. The wireless terminal determines which geographical area it is located in, based on its geographic location (typically through use of a geo-positioning device such as a GPS unit) and said mapping information, and determines which time slot is assigned to the geographical area. The wireless terminal transmits only during a time interval assigned to time slot T. If the wireless terminal wishes to transmit at a time outside of such time slot intervals, it holds the data and transmits it at some later time within timeslot T.

Advantageously, all wireless terminals can "listen" and receive data during all time slots. In this way, a terminal in one geographical area may communicate directly with terminals in other areas, without necessitating sending the traffic through a 'base station' or other relaying facility. This reduces total traffic and reduces the delay in message delivery caused by multiple hops. This distinguishes the present invention from cellular telephone radio schemes, all of which require traffic between mobile terminals in different areas to transit the base stations of those areas. Also, it is advantageous that the present invention requires no fixed infrastructure, whereas cellular telephony and like schemes require the installation of cell towers and base stations.

Advantageously, an alternative embodiment may obey the time slot transmission scheme above only for certain types of transmissions, such as (for example) only for broadcast transmissions, where other media-access protocols may be used for other types of traffic. For example, for unicast traffic (where one terminal wants send to exactly one other, known, terminal), the method could use the standard MACAW protocol as is known in the art (wherein CTS, RTS, DATA, and ACK messages are exchanged without regard to what timeslot each is transmitted in). Thus, the present invention can be used as a means to reduce broadcast interference concurrently with other known techniques for reducing interference for unicast traffic. Other combinations are possible as well.

These and other advantages of the invention will be apparent to those of ordinary skill in the art by reference to the following detailed description and the accompanying drawings.

DETAILED DESCRIPTION

Figure 1:
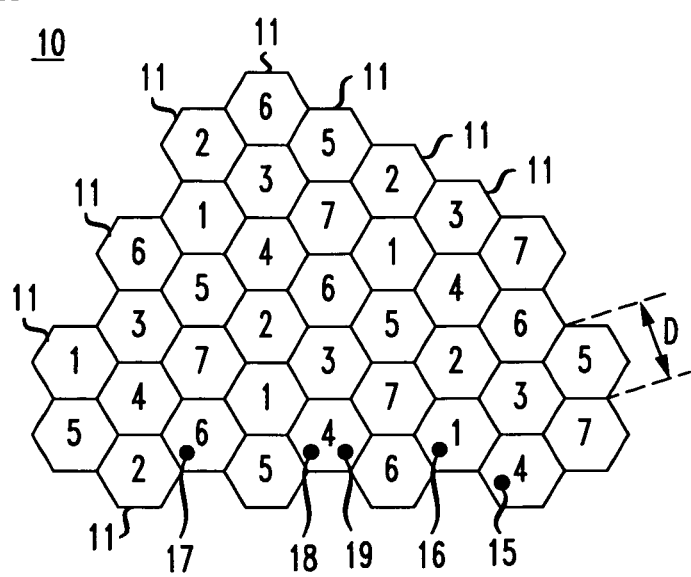
FIG. 1 shows an embodiment of a MANET divided into geographical areas having assigned time slots in accordance with the present invention.

FIG. 1 shows an embodiment of a MANET 10 that is divided into geographical areas 11 having assigned time slots in accordance with the present invention. MANET 10 is a network of mobile devices, or wireless terminals, that are capable of transmitting/receiving data packets to/from each other. The wireless terminals use CSMA/CA techniques to control the broadcasting of packets within MANET 10. Each wireless terminal in MANET 10 is capable of determining its own geographical location through, for example, the Global Positioning System (GPS). Further, each wireless terminal in MANET 10 has a detection range, a link range, and an interference range. The detection range is the maximum distance at which a wireless terminal can detect a transmission from another wireless terminal. The link range is the maximum distance within which a wireless terminal can successfully receive a data message intact from another wireless terminal in the absence of interference. The interference range is the maximum distance apart two wireless terminals A and B may be such that there exists a point P that is within link range of terminal A and yet a transmission from terminal B would interfere with the transfer of data from terminal A to a wireless terminal located at P As shown, MANET 10 covers a geographical operating region including geographical areas 11. Each geographical area 11 has a hexagonal shape with a diameter D. The diameter D of a given geographical area 11 is the maximum distance there can be between any two points in the geographical area. In MANET 10, each geographical area 11 has a diameter D equal to detection range of the wireless terminals communicating therein. This insures that wireless terminals within the geographical area can detect transmissions from each other and can thus avoid collisions with each other using CSMA/CA.

Each geographical area 11 is assigned one of time slots 1-7. Time slots 1-7 are periods of time during which a wireless terminal located in MANET 10 may transmit packet data to other wireless terminals. For example, wireless terminal 15 located in the geographical area assigned time slot 4 may only transmit during time slot 4. Similarly, wireless terminal 17 located in the geographical area assigned time slot 6 may only transmit during time slot 6.

In accordance with the present invention, time slots 1-7 are assigned such that geographical areas having the same time slot are far enough from each other that wireless terminals within them cannot interfere with each other. This is accomplished by making sure that the wireless terminals in geographical areas having the same time slot are outside the interference range of each other. For example, referring to FIG. 1, the time slots are assigned such that wireless terminal 15 located in the geographical area assigned time slot 4 can not interfere with communications between wireless terminal 18 and 19 located in a different geographical area also assigned time slot 4. Also, wireless terminal 15 can send a packet during time slot 4 that is received by wireless terminal 16 (located within link range of terminal 15) without the chance of interference by wireless terminal 18 or 19 which may also transmit during time slot 4.

Thus, it should be understood that in order for wireless terminal 15 to be outside the interference range of wireless terminal 19, the minimum distance between their respective geographical areas must be greater than the interference range of the wireless terminals. It should also be understood that if all wireless terminals in MANET 10 restrict when they transmit only to their assigned time slot (determined by using their position sensing capability to see which geographical area they are located in), and only when they can not detect another transmission within their geographical area, they are guaranteed not to interfere with the reception of any other wireless terminals. Advantageously, this avoids packet loss due to interference and the need for time-consuming acknowledgement protocols, as in the prior art.

It should be understood that the present invention is not limited to a MANET being divided into geographical areas having a hexagonal shape. The geographical areas, in accordance with the present invention, can be any desired shape including squares, rectangles, triangles, circles, curvilinear regions, multiple non-congruent shapes, non convex shapes, irregular tessellations, or any arrangement of geometric regions (arrangements which may not cover all points in an area, or in which some regions may overlap each other). Similarly, it should be understood that present invention is not limited to any particular number of time slots. The geographical areas, in accordance with the invention, may be assigned any number of different time slots as long as wireless terminals in geographical areas having the same time slot are outside the interference range of each other. It should therefore be appreciated that using a greater number of time slots provides for the ability for greater separation between the geographical areas having the same time slot. That is, the greater the number of time slots being assigned, the greater the number of intermediate geographical areas having different time slots can exist between the geographical areas having the same time slot, thereby providing for a greater distance between the geographical areas having the same time slots. Thus, if the wireless transmitters are built with a longer interference range relative to the detection range, more time slots should be used.

As the number of time slots increases, however, there is less time available for each time slot and thus less time in which a wireless terminal may transmit data in any given geographical area. Thus, it is desirable to find the minimum number of times slots needed to achieve the desired separation between the geographical areas having the same time slot.

It should be understood, however, that in one illustrative embodiment, the diameter D of the geographical areas should not be greater than the detection range of the wireless terminals (otherwise wireless terminals within a geographical area can be outside the detection range of each other). Hence, increasing the size of the geographical areas to separate the geographical areas having the same time slot is not always an option. As a result, it is contemplated that in many cases the desired separation will be achieved instead by increasing the number of time slots, which thereby increases the number of intermediate geographical areas that can exist between the "same time slots areas".

In an alternative embodiment, it may be advantageous to define the geographical areas in such a way that they overlap. In this case a wireless terminal located at a point belonging to more than one region will be allowed to transmit during any of the time slots assigned to the overlapping areas. This is within the present invention as long as all geographical areas are still separated by distances great enough to guarantee that terminals in different areas assigned the same time slot do not interfere.

Thus, assuming the geographical areas have a diameter equal to the detection range of the wireless terminals, the minimum number of time slots possible will greatly depend on the ratio R of the interference range to the detection range of the wireless terminals. When R is less than 1 (i.e. when the detection range is greater than the interference range), the wireless terminals in geographical areas having the same time slot do not need to be as far apart as when R is greater than 1 (i.e. when the interference range is greater than the detection range). Thus, it should be understood that for a MANET divided into geographical areas having a fixed size and shape (i.e. having a diameter equal to the detection range of the wireless terminals), as R increases so does the need for a greater number of time slots. This is due to the fact that as R increases so does the number of intermediate geographical regions needed to achieve the desired separation between the geographical areas having the same time slot.

Through experimentation, the inventor herein has found that for a MANET divided into hexagonal-shaped areas having a diameter equal to the detection range of the wireless terminals, the desired number of time slots depends on the ratio R as follows:

1. When R is greater than zero but less than or equal to 0.5, three time slots are preferred.
2. When R is greater than 0.5 but less than or equal to $(\sqrt{3})/2$, four time slots are preferred.
3. When R is greater than $(\sqrt{3})/2$ but less than or equal to $(\sqrt{7})/2$, seven time slots are preferred.
4. When R is greater than $(\sqrt{7})/2$ but less than or equal to $\sqrt{3}$, nine time slots are preferred.
5. When R is greater than $\sqrt{3}$ but less than or equal to 2, twelve time slots are preferred.
6. When R is greater than 2 but less than or equal to $(\sqrt{19})/2$, thirteen time slots are preferred.
7. When R is greater than $(\sqrt{19})/2$ but less than or equal to $3*(\sqrt{3})/2$, sixteen time slots are preferred.

Figure 4:
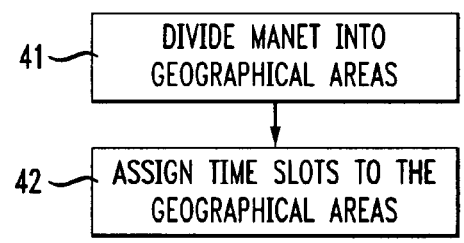
FIG. 4 illustrates an embodiment of a method for reducing interference between wireless terminals communicating in a MANET in accordance with the present invention.

Referring now to FIG. 4, there is shown an embodiment of a method 40 for reducing interference between wireless terminals communicating in a MANET. The wireless terminals each have an interference range and a detection range and are operable to determine their geographical location. Method 40 begins at step 41 wherein the MANET is divided into discrete geographical areas having a given shape and a given size. For example, the geographical areas may have a hexagonal shape with a diameter D equal to the detection range of the wireless terminals. At step 42, each geographical area is assigned one of a plurality of time slots during which wireless terminals located in the geographical area may broadcast.

Assuming the geographical areas have a diameter D equal to the detection range of the wireless terminals, the minimum number of time slots possible will greatly depend on the ratio R of the interference range to the detection range of the wireless terminals. When R is less than 1 (i.e. when the detection range is greater than the interference range), the wireless terminals in geographical areas having the same time slot do not need to be as far apart as when R is greater than 1 (i.e. when the interference range is greater than the detection range). Thus, it should be understood that for a MANET divided into geographical areas having a fixed size and shape (i.e. having a diameter D equal to the detection range of the wireless terminals), as R increases so does the need for a greater number of time slots. This is due to the fact that as R increases so does the number of intermediate geographical regions needed to achieve the desired separation between the geographical areas having the same time slot.

Figure 2:
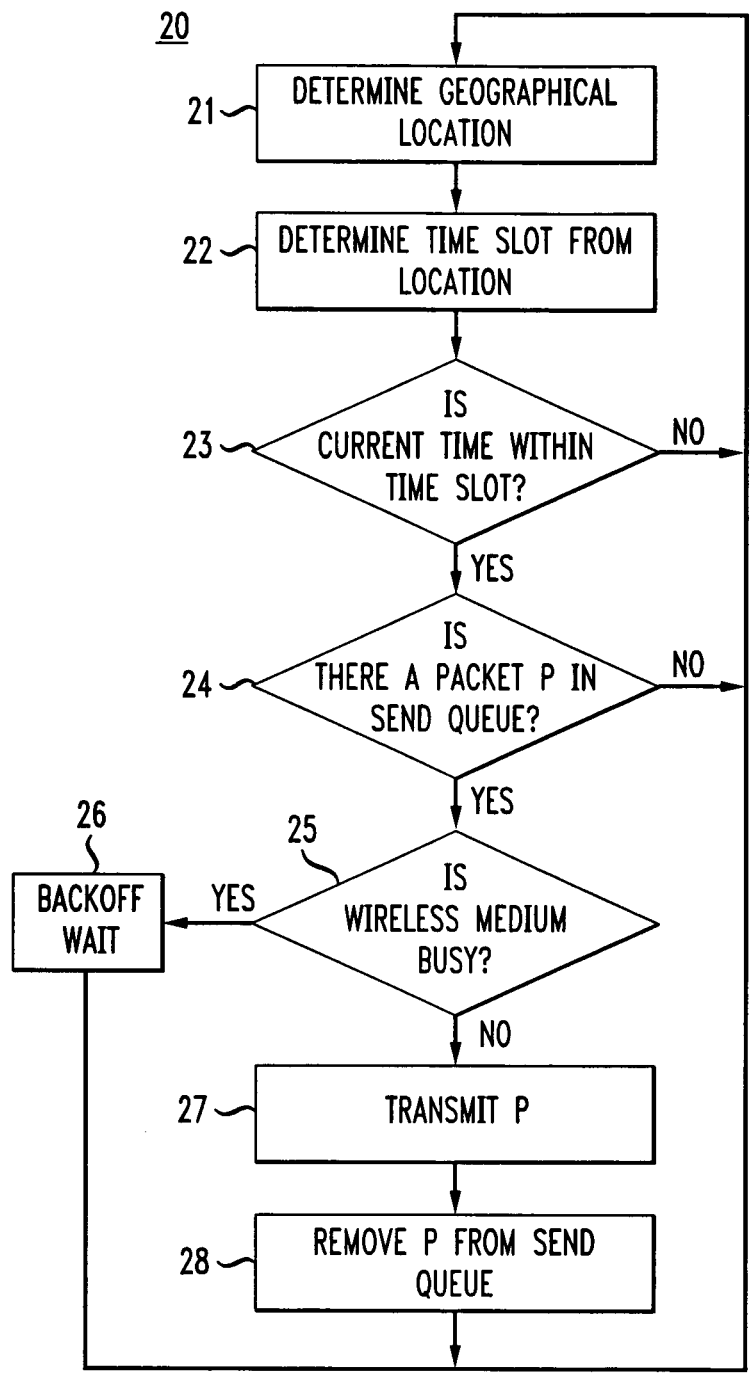
FIG. 2 illustrates a method for a wireless terminal communicating in a MANET in accordance with the present invention.

Referring now to FIG. 2, there is shown a method 20 for a wireless terminal communicating in a MANET in accordance with the present invention. Whenever the wireless terminal determines that another packet needs to be sent, it places it in a queue. Method 20 is an ongoing process loop that continues as new packets are added to the queue. As shown, method 20 begins at step 21 wherein the wireless terminal determines its own geographical location. The wireless terminal may determine its own geographical location through any available means including, for example, a global positioning system.

At step 22, based on its current geographical location, the wireless terminal determines the time slot for the geographical area of the MANET in which it is located. To do this, the wireless terminal may search through its own memory storage device in which there is stored MANET mapping information. The MANET mapping information includes information regarding how the MANET is divided into geographical areas having assigned time slots in accordance with the present invention. MANET 10, shown in FIG. 1, illustrates an example of the type of MANET mapping information that may be stored in the memory storage device of the wireless terminal. In general, the MANET mapping information defines the geographical areas that comprise the MANET, and it lists the transmission time slots assigned to the geographical areas. The information defining the geographical areas of the MANET may include, for example, the size, shape, location and geographical coordinates of each geographical area. Other methods for storing and accessing said mapping information are well known in the art. Each geographical area is thereby identifiable and specific, and is assigned a specific time slot during which a wireless terminal located in the geographical area may transmit.

At step 23, the wireless terminal determines whether the current time is within the time slot determined in step 22. If the current time is not within the time slot, it loops back to step 21 to determine it new location (which can be the same as its previous location if the wireless terminal did not move). If the current time is within the time slot, in step 24, it determines whether there is a packet in the queue. If there is no packet in the queue, it loops back to step 21. If there is a packet in the queue then, in step 25, the wireless terminal determines whether the wireless medium is busy (i.e. another terminal is transmitting). If the medium is busy, then the wireless terminal waits a predetermined period of time at step 26 and then loops back to step 21. If the medium is not busy then, at step 27, the wireless terminal transmits the packet. At step 28, the wireless terminal removes the transmitted packet from the queue and loops back to step 21.

In an alternative embodiment allowing overlapping geographical areas, step 22 would determine the assigned SET of time slots for all areas in which it is located. Step 23 would then determine whether the current time belongs to at least one time slot in that set.

Figure 3:
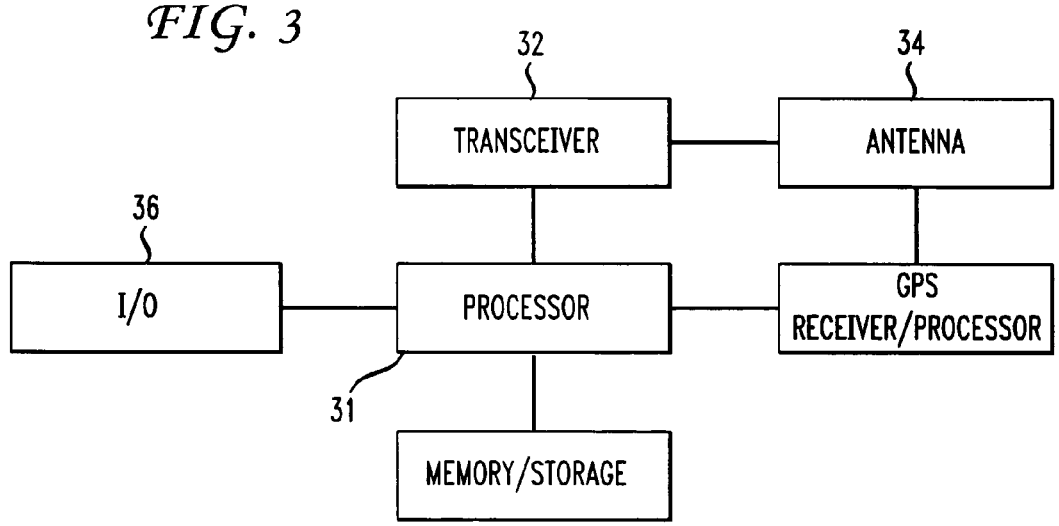
FIG. 3 illustrates an embodiment of a wireless terminal operable to communicate in a MANET in accordance with the present invention.

It should be understood that a wireless terminal in accordance with the present invention may be any wireless device operable to execute a communications application to perform the above described functions. Such wireless terminals executing a communications application are well known in the art, and may be implemented, for example, using well known processors, transceivers, memory units, storage devices, computer software, and other components. A high level block diagram of such a wireless terminal 30 is shown in FIG. 3. As shown, wireless terminal 30 contains a processor 31 which controls the overall operation of wireless terminal 30 by executing computer program instruction which define the communications application. The computer program instructions may be hard coded in processor 31 or loaded from an erasable programmable read only memory device (not shown) when execution of the computer program instructions is desired. Thus, the communications application will be defined by computer program instructions stored in processor 31 and/or erasable programmable read only memory and/or magnetic disk and/or random access memory (not shown) and the communications application will be controlled by processor 31 executing the computer program instructions. Wireless terminal 30 includes a memory storage device 35 in which information including the MANET mapping information described above can be stored. Wireless terminal 30 also include a transceiver 32 coupled to an antenna 34 through which data is received and/or transmitted in a MANET. Wireless terminal 30 also includes a GPS receiver/processor 33 that controls the execution of the geographical locating function of wireless terminal 30. Through GPS receiver/processor 33, wireless terminal 30 can use the global positioning system to determine its own location. Wireless terminal 30 also includes input/output 36 which represents devices (e.g., display, keypad, speakers, buttons, etc.) that allow for user interaction with wireless terminal 30. One skilled in the art will recognize that an implementation of an actual wireless terminal will contain other components as well, and that FIG. 3 is a high level representation of some of the components of such a wireless terminal for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for reducing interference between wireless terminals communicating in a MANET that covers a geographical operating region, each wireless terminal having an interference range and a detection range, each wireless terminal being operable to determine its own geographical location in the geographical operating region, the method comprising:

dividing the geographical operating region of the MANET into a plurality of geographical areas; and assigning each geographical area one of a plurality of time slots during which wireless terminals located in the geographical area may transmit, such that each wireless terminal located in a geographical area transmits only during a time interval assigned to a time slot assigned to a respective geographical area, the assigning comprising:

calculating a ratio R equal to the ratio of the interference range to the detection range of at least one wireless terminal;

determining a number of time slots T based on the ratio R; and assigning each geographical area one of the time slots T, and the time slots being assigned such that a wireless terminal located anywhere in a geographical area having a given time slot may not interfere with a wireless terminal located in another geographical area having the same time slot.

2. The method of claim 1 wherein dividing comprises determining at least one of the geographical areas to be hexagonal in shape.

3. The method of claim 1 wherein dividing comprises determining at least one of the geographical areas to have diameter equal to the detection range of at least one of the wireless terminals.

4. The method of claim 1 wherein dividing comprises determining at least one of the geographical areas to be rectangular in shape.

5. The method of claim 1 wherein dividing comprises determining at least one of the geographical areas to be triangular in shape.

6. The method of claim 1 wherein dividing comprises determining at least one of the geographical areas to be circular in shape.

7. The method of claim 1 wherein dividing comprises dividing the MANET into geographical areas wherein each area has a hexagonal shape with a diameter equal to the detection range of at least one of the wireless terminals, and wherein there are no gaps between the geographical areas.

8. The method of claim 1 wherein he number of time slots T is equal to 3 when the ratio R is less than or equal to 0.5.

9. The method of claim 1 wherein the number of time slots T is equal to 4 when the ratio R is less than or equal to $(\sqrt{3})/2$.

10. The method of claim 1 wherein the number of time slots T is equal to 7 when the ratio R is less than or equal to $(\sqrt{7})/2$.

11. The method of claim 1 wherein the number of time slots T is equal to 9 when the ratio R is less than or equal to $\sqrt{3}$.

12. The method of claim 1 wherein the number of time slots T is equal to 12 when the ratio R is less than or equal to 2.

13. The method of claim 1 wherein the number of time slots T is equal to 13 when the ratio R is less than or equal to $(\sqrt{19})/2$.

14. The method of claim 3 wherein the number of time slots T is equal to 16 when the ratio R is less than or equal to $3*(\sqrt{3})/2$.

15. A wireless terminal for operation in a MANET, the wireless terminal having a detection range and an interference range, the wireless terminal comprising:

means for determining its geographical location;

means for storing mapping information, the mapping information comprising a plurality of predefined geographical areas each of which is assigned one of a set of time slots T such that a wireless terminal located anywhere in a geographical area having a given time slot may not interfere with a wireless terminal located in another geographical area having the same time slot, a number of the set of time slots T based on a ratio R equal to the ratio of an the interference range to a the detection range of at least one wireless terminal;

means for determining which geographical area it is located in, based on the geographical location, and which time slot is assigned to the geographical area; and means for transmitting during the time slot assigned to the geographical area in which the wireless terminal is located.

16. The wireless terminal of claim 15 wherein the means for determining its geographical location comprises a Global Positioning System.

17. The wireless terminal of claim 15 wherein the means for storing comprises a memory storage device.

18. The wireless terminal of claim 15 wherein at least one of the geographical areas has a hexagonal shape.

19. The wireless terminal of claim 15 wherein at least one of the geographical areas has a rectangular shape.

20. The wireless terminal of claim 15 wherein at least one of the geographical areas has a triangular shape.

21. The wireless terminal of claim 15 wherein at least one of the geographical areas has a circular shape.

22. The wireless terminal of claim 15 wherein at least one of the geographical areas has a diameter D equal to the detection range of the wireless terminal.

23. The wireless terminal of claim 15 wherein each the geographical area has a hexagonal shape with a diameter D equal to the detection range of the wireless terminal.

24. The wireless terminal of claim 15 wherein the number of time slots T is equal to 3 when the ratio R is less than or equal to 0.5.

25. The wireless terminal of claim 15 wherein the number of time slots T is equal to 4 when the ratio R is less than or equal to $(\sqrt{3})/2$.

26. The wireless terminal of claim 15 wherein the number of time slots T is equal to 7 when the ratio R is less than or equal to $(\sqrt{7})/2$.

27. The wireless terminal of claim 15 wherein the number of time slots T is equal to 9 when the ratio R is less than or equal to $\sqrt{3}$.

28. The wireless terminal of claim 15 wherein the number of time slots T is equal to 12 when the ratio R is less than or equal to 2.

29. The wireless terminal of claim 15 wherein the number of time slots T is equal to 13 when the ratio R is less than or equal to $(\sqrt{19})/2$.

30. The wireless terminal of claim 15 wherein the number of time slots T is equal to 16 when the ratio R is less than or equal to $3*(\sqrt{3})/2$.

31. A method for a wireless terminal communicating in a MANET, the MANET having a geographical operating region divided into a plurality of geographical areas, the method comprising:

determining which geographical area the wireless terminal is located in;

determining at least one time slot assigned to the determined geographical area; and transmitting during the at least one time slot assigned to the determined geographical area, wherein the wireless terminal has an interference range and a detection range, each geographical area being assigned at least one of a set of time slots T, the time slots being assigned to the geographical areas such that a wireless terminal located anywhere in a geographical area having a given time slot assigned may not interfere with a wireless terminal located in another geographical area having the same time slot assigned, a number of the set of time slots T based on a ratio R equal to the ratio of the interference range to the detection range of the wireless terminal.

32. The method of claim 31 further comprising determining the current geographical location of the wireless terminal using a Global Positioning System.

33. The method of claim 31 wherein determining which geographical area the determined current geographical location is located in retrieving MANET mapping information from a memory storage device, the MANET mapping information including information regarding the size, shape and location of each the geographical area.

34. The method of claim 31 wherein at least on of the geographical areas is hexagonal in shape.

35. The method of claim 31 wherein at least one of the geographical areas is rectangular in shape.

36. The method of claim 31 wherein at least one of the geographical areas is triangular in shape.

37. The method of claim 31 wherein at least one of the geographical areas is circular in shape.

38. The method of claim 31 wherein said shape of the geographical areas is hexagonal, and wherein each the geographical area has a diameter D.

* * * * *